(12) United States Patent
Kim

(10) Patent No.: US 10,819,066 B2
(45) Date of Patent: Oct. 27, 2020

(54) INLET APPARATUS OF AN ELECTRIC VEHICLE AND A CONTROL METHOD THEREOF

(71) Applicants: HYUNDAI MOTOR COMPANY, Seoul (KR); KIA MOTORS CORPORATION, Seoul (KR)

(72) Inventor: Dong-Hwan Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/539,781

(22) Filed: Aug. 13, 2019

(65) Prior Publication Data
US 2020/0251853 A1  Aug. 6, 2020

(30) Foreign Application Priority Data

Feb. 1, 2019 (KR) .................. 10-2019-0013837

(51) Int. Cl.
| | | |
|---|---|---|
| *H01R 13/62* | (2006.01) | |
| *H01R 13/639* | (2006.01) | |
| *B60L 53/16* | (2019.01) | |
| *E05B 47/00* | (2006.01) | |

(52) U.S. Cl.
CPC .......... *H01R 13/6205* (2013.01); *B60L 53/16* (2019.02); *H01R 13/639* (2013.01); *E05B 47/00* (2013.01); *E05B 47/0002* (2013.01); *E05B 2047/0007* (2013.01); *H01R 2201/26* (2013.01)

(58) Field of Classification Search
CPC . H01R 13/6205; H01R 13/6278; E05B 47/00; E05B 47/0002; E05B 2047/0007
See application file for complete search history.

(56) References Cited

U.S. PATENT DOCUMENTS

| | | | | |
|---|---|---|---|---|
| 6,639,496 | B1* | 10/2003 | van Namen | E05B 47/00 335/229 |
| 2005/0103926 | A1* | 5/2005 | Hawthorne | F42B 10/64 244/3.27 |
| 2008/0169890 | A1* | 7/2008 | Irwin | E05B 47/026 335/228 |
| 2010/0132418 | A1* | 6/2010 | Chen | E05B 47/0002 70/277 |

(Continued)

FOREIGN PATENT DOCUMENTS

| | | |
|---|---|---|
| CN | 102904126 | 3/2015 |
| CN | 105313713 | 2/2016 |
| GB | 190910345 | * 5/1910 |

*Primary Examiner* — Tho D Ta
(74) *Attorney, Agent, or Firm* — Lempia Summerfield Katz LLC

(57) ABSTRACT

An inlet apparatus includes: a locking pin; a holder configured to accommodate the locking pin; and a first electromagnet provided at a lower portion of the holder. The first electromagnet includes a lower coil for generating a repulsive force or an attractive force in a vertical direction with respect to the locking pin. The inlet apparatus also includes a second electromagnet provided at a side of the holder, the second electromagnet including a side coil for fixing the locking pin. The inlet apparatus also includes a controller configured to control a current of the lower coil of the first electromagnet and a current of the side coil of the second electromagnet.

13 Claims, 12 Drawing Sheets

(56) References Cited

U.S. PATENT DOCUMENTS

| | | | |
|---|---|---|---|
| 2010/0313615 A1* | 12/2010 | Chen | E05B 47/0002 |
| | | | 70/276 |
| 2014/0210410 A1* | 7/2014 | Gorenzweig | B60L 11/1818 |
| | | | 320/109 |
| 2016/0280086 A1* | 9/2016 | Lopez | B60L 53/16 |
| 2016/0352043 A1* | 12/2016 | Eromaki | H05K 5/0286 |

* cited by examiner

INLET APPARATUS OF AN ELECTRIC VEHICLE AND A CONTROL METHOD THEREOF

CROSS-REFERENCE TO RELATED APPLICATION(S)

This application is based on and claims priority under 35 U.S.C. § 119 to Korean Patent Application No. 10-2019-0013837, filed on Feb. 1, 2019 in the Korean Intellectual Property Office, the disclosure of which is incorporated herein by reference.

BACKGROUND

1. Technical Field

The present disclosure relates to an inlet apparatus of an electric vehicle and a method of controlling the same, and more specifically, to an inlet apparatus of an electric vehicle using a magnetic substance so that an outlet (charge connector) is not detached from an inlet.

2. Description of the Related Art

Recently, demand and development of Plug-in Hybrid Electric Vehicles and Electric Vehicles are increasing.

Electric vehicles charge electrical energy into a high-capacity battery. Electric vehicles use the charged electrical energy to operate a motor and various electronic devices for driving the vehicle.

A charging system of the electric vehicle comprises a charging station for power supply and control, an outlet for supplying electrical energy to the electric vehicle provided from the charging station, and an inlet provided in the electric vehicle.

The outlet (charge connector) is detachably mounted on the inlet.

When the outlet is inserted into the inlet and the electric vehicle is charging, an actuator is operated to prevent the outlet from being detached from the inlet. Referring to FIG. 1, an inlet apparatus 1 is provided with a locking pin 10. When the locking pin 10 protrudes outwardly, the inserted outlet is controlled not to be detached. When the locking pin 10 is withdrawn inwardly, the inserted outlet is controlled to be detached.

The locking pin 10 is operated by an actuator provided in the inlet apparatus 1. Specifically, the locking pin 10 is connected to a tooth wheel that is engaged with the actuator. The locking pin 10 can be protruded outwardly or withdrawn inwardly as the tooth wheel rotates. A variable resistor is provided in the tooth wheel so that the position of the locking pin 10 can be detected by sensing that the resistance changes as the locking pin 10 moves.

On the other hand, there is a possibility that the tooth wheel will become damaged due to the nature of the structure and materials, and when the toothed wheel is broken, the locking pin 10 cannot perform the above-mentioned controlling operation.

SUMMARY

Therefore, it is an object of the disclosure to provide an inlet apparatus operated by a magnetic substance and an electromagnet in place of a tooth wheel, and to provide a control method thereof.

Another object of the disclosure is to provide an inlet apparatus capable of confirming the position of a locking pin without a tooth wheel, and to provide a control method thereof.

Therefore, it is an aspect of the present disclosure to provide an inlet apparatus. The inlet apparatus includes: a locking pin; a holder configured to accommodate the locking pin; and a first electromagnet provided at a lower portion of the holder. The first electromagnet includes a lower coil for generating a repulsive force or an attractive force in a vertical direction with respect to the locking pin. The inlet apparatus also includes a second electromagnet provided at a side of the holder. The second electromagnet includes a side coil for fixing the locking pin. The inlet apparatus also includes a controller configured to control a current of the lower coil of the first electromagnet and a current of the side coil of the second electromagnet.

The inlet apparatus may include the second electromagnet provided with the side coil inside the holder.

The inlet apparatus may include the second electromagnet provided with the side coil, which encloses the holder.

The inlet apparatus may include the second electromagnet, which is provided with the side coil surrounding an iron core, is provided inside the holder.

The inlet apparatus may further include an outer coil, which is provided to surround the outside of the holder and which is configured to detect a change of a magnetic flux due to upward movement or downward movement of the locking pin. The controller is connected to the outer coil and is configured to determine a degree of in/out of the locking pin based on the change of the magnetic flux.

The inlet apparatus may include the locking pin, which may comprise an insulating member, a magnetic substance provided on a lower surface of the insulating member, and a metal member provided on an opposite surface to the lower surface.

The inlet apparatus may include the controller configured to control the current of the lower coil to be applied to the lower coil and to control the current of the side coil to be applied to the side coil so that the locking pin is held in the holder.

The inlet apparatus may include the controller configured to control the current of the lower coil to be applied to the lower coil to a first direction and to control the current of the side coil to not be applied to the side coil. The first electromagnet may transmit a repulsive force to the locking pin so that the locking pin is configured to protrude.

The inlet apparatus may include the controller configured to control the current of the lower coil to not be applied to the lower coil and to control the current of the side coil to be applied to the side coil The second electromagnet may transmit an attractive force to the locking pin to maintain the locking pin in a protruding state.

The inlet apparatus may include the controller configured to control the current of the lower coil to be applied to the lower coil to a second direction and to control the current of side coil to not be applied to the side coil. The first electromagnet may transmit an attractive force to the locking pin to accommodate the locking pin.

The inlet apparatus may include the locking pin, which may comprise an insulating member, a first magnetic substance provided on a lower surface of the insulating member, a second magnetic substance provided on an upper surface of the insulating member, and a metal member provided on an upper surface of the second magnetic substance which includes a first layer and a second layer disposed to cross a polarity of the first layer. The second electromagnet may comprise a first vertical coil corresponding to the first layer and configured to generate a repulsive force or an attractive force on the first layer and may comprise a second vertical coil corresponding to the second layer and configured to generate a repulsive force or an attractive force on the second layer.

The inlet apparatus may further include an outer coil, which is provided to surround the outside of the holder and is provided at a position through which the metal member passes and detects a change of a magnetic flux due to upward movement or downward movement of the metal member. The controller may be connected to the outer coil and configured to determine a degree of in/out of the locking pin based on the change of the magnetic flux.

The inlet apparatus may include the second electromagnet provided such that the first vertical coil of the first layer and the second vertical coil of the second layer generate magnetic forces of different polarities.

The inlet apparatus may include the second electromagnet comprising two electromagnets to generate magnetic forces of different polarities with respect to a longitudinal plane of the holder.

According to one aspect of the disclosure, the durability of the inlet apparatus, which includes the locking pin, is increased by using the magnetic substance and the electromagnet in place of a tooth wheel.

Further, since the movement of the locking pin is detected through the change of the magnetic flux, the accommodated position of the locking pin can be accurately detected.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
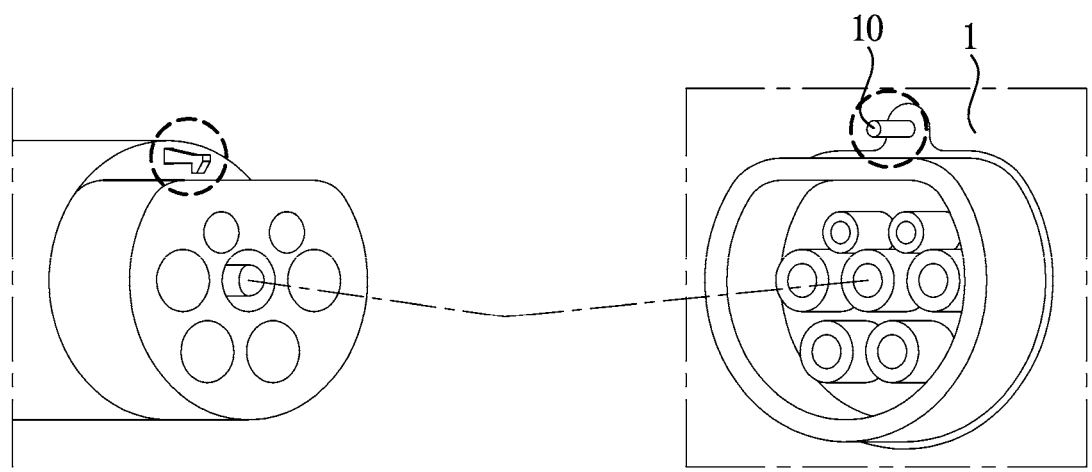
FIG. 1 is a view illustrating an inlet apparatus including an outlet and a locking pin.

Like reference numerals refer to like elements throughout the specification. Not all elements of embodiments of the present disclosure are described, and a description of what are commonly known in the art or what overlap each other in the embodiments has been omitted. The terms as used throughout the specification, such as "~part," "~module," "~member," "~block," and the like, may be implemented in software and/or hardware. A plurality of "~parts," "~modules," "~members," or "~blocks" may be implemented in a single element, or a single "~part," "~module," "~member," or "~block" may include a plurality of elements.

It should be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a layer is "on" another layer or substrate, the layer may be directly on another layer or substrate or a third layer may be disposed therebetween.

Although the terms "first," "second," "A," "B," and the like may be used to describe various components, the terms do not limit the corresponding components. Instead, the terms are used only for the purpose of distinguishing one component from another component.

As used herein, the singular forms "a," "an" and "the" are intended to include the plural forms as well, unless the context clearly indicates otherwise.

Reference numerals used for method steps are only used for convenience of explanation, not to limit an order of the steps. Thus, unless the context clearly dictates otherwise, the written order may be practiced otherwise.

Hereinafter, the operating principles and embodiments of the disclosure are described with reference to the accompanying drawings.

Figure 2:
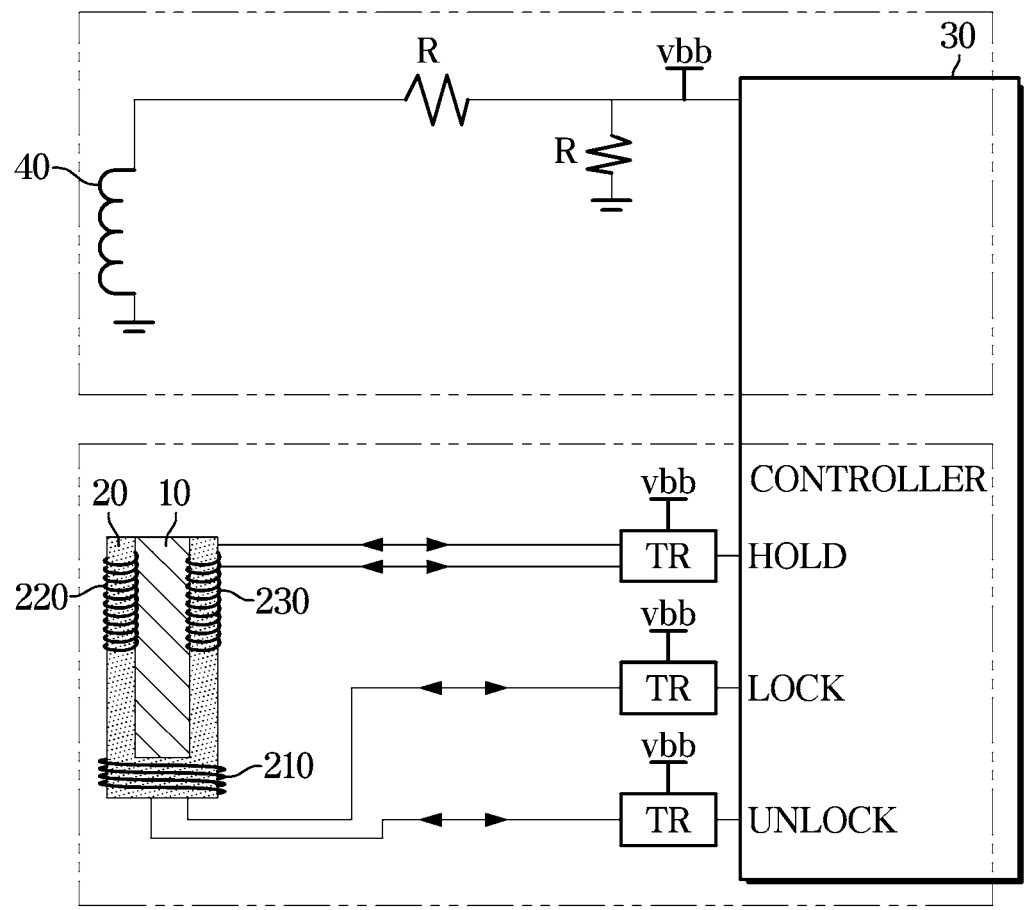
FIG. 2 and FIG. 3 are views illustrating a circuit for connecting an inlet apparatus and a controller according to an embodiment of the disclosure.
Figure 3:
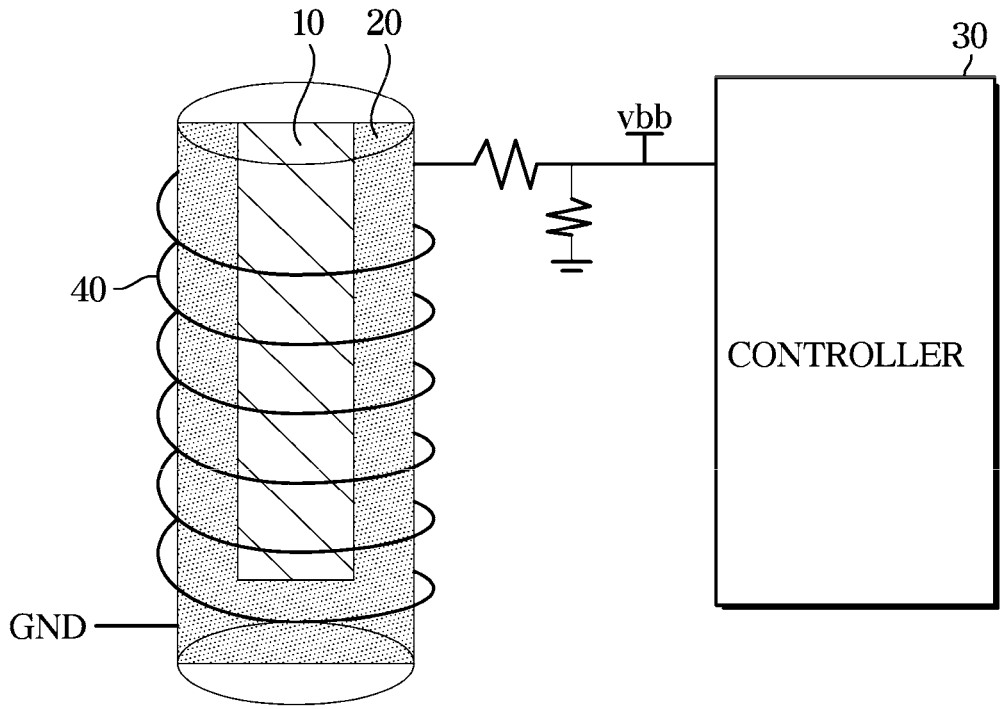
Figure 3:
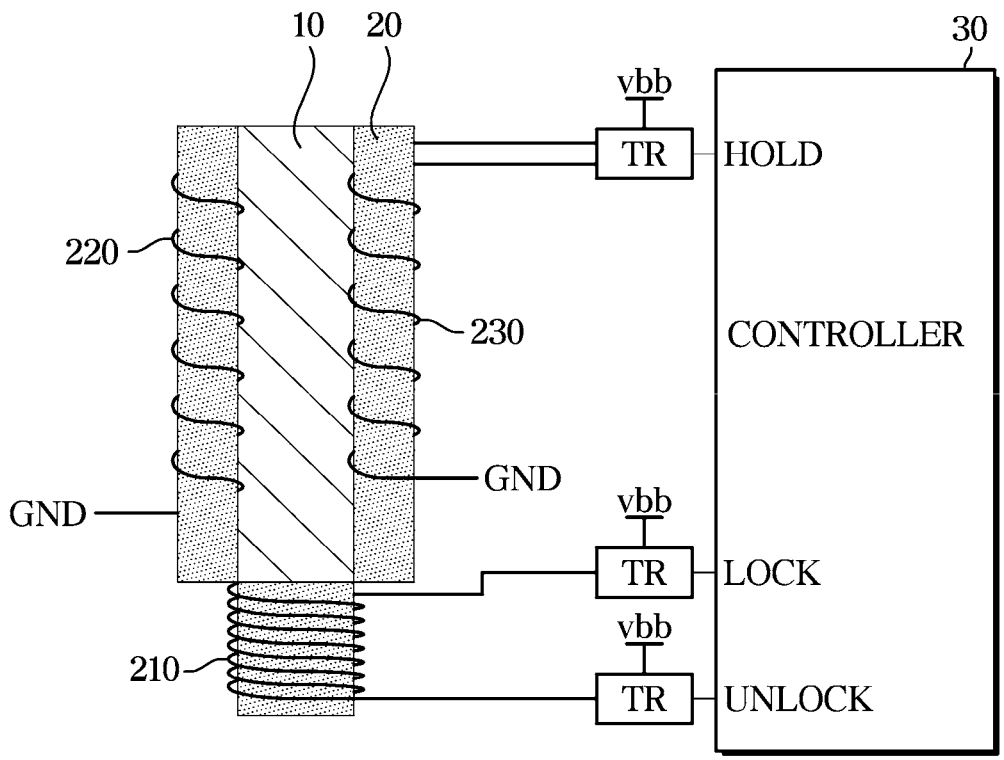

FIG. 1 is a view illustrating an inlet apparatus including an outlet and a locking pin. FIG. 2 and FIG. 3 are views illustrating a circuit for connecting an inlet apparatus and a controller according to an embodiment of the disclosure.

In a conventional locking pin driving method, a locking pin is connected to a tooth wheel engaged with an actuator. The locking pin protrudes or is accommodated inside an inlet apparatus as the tooth wheel rotates, thereby controlling the attachment and detachment between an inlet and an outlet. Unlike the conventional locking pin driving method, an embodiment of the disclosure controls movement of a locking pin by using a magnetic substance and an electromagnet. An inlet apparatus is shown in FIG. 1. Specific elements and operations are described in detail with reference to FIG. 2 and FIG. 3.

An inlet apparatus 1 according to one embodiment includes a locking pin 10, a holder 20 for accommodating the locking pin 10, and a controller 30.

The locking pin 10 can be accommodated in the holder 20. When the entirety of the locking pin 10 is accommodated in the holder 20, an inlet apparatus 1 is in an unlocked state and an outlet can be detached from the inlet apparatus 1. In contrast, when a part of the locking pin 10 protrudes from the holder 20, the inlet apparatus is locked, and the outlet is controlled so as not to be detached from the inlet apparatus 1.

As described above, the locking pin 10 should be fixed so that the inlet apparatus corresponds to either the unlocked state or the locked state. Specific means for fixing the locking pin 10 in the holder 20 are described below.

The inlet apparatus 1 may include a first electromagnet 210 and second electromagnets 220 and 230 to move or fix the locking pin 10 in the holder 20. The shape of the holder 20 may be a cylindrical shape, but is not limited to the cylindrical shape, and may thus adopt various other shapes such as a rectangular column.

The locking pin 10 may be moved by a magnetic force generated by the first electromagnet 210 by providing a permanent magnet at a lower portion thereof. The first electromagnet 210 may be provided at a lower portion of the holder 20 and may include a lower coil to generate a repulsive force or an attractive force with respect to the locking pin 10. For example, when a current in a first direction is applied to the lower coil, the locking pin 10 can protrude to the outside by the repulsive force generated in the lower coil. When a current in the second direction is applied to the lower coil, the locking pin 10 can be accommodated, i.e., be withdrawn inside the holder 20 by the attractive force.

The locking pin 10 may be fixed by a magnetic force generated by the second electromagnets 220, 230 at least a portion of which is a metal member and is on the side of the holder 20. The second electromagnets 220, 230 are provided on the side of the holder 20 and may include at least one side coil to fix the locking pin 10. In addition, the second electromagnets 220 and 230 are two electromagnets, and may be provided symmetrically with respect to the longitudinal axis of the holder 20. The second electromagnets 220, 230 may be provided on the left and right sides of the locking pin 10 to prevent the locking pin 10 from being fixed or preventing unintended movement.

The first electromagnet 210 and the second electromagnets 220, 230 may be configured such that a coil includes a part of the holder 20 as an iron core and surrounds the iron core. The first electromagnet 210 and the second electromagnets 220, 230 may be provided inside or outside the holder so as to generate a repulsive force or an attractive force without contacting the locking pin 10.

The controller 30 can control the inlet apparatus 1 to either the unlocked state or the locked state by controlling the amount of current and direction of the current flowing through the first electromagnet 210 and the second electromagnets 220, 230.

The controller 30 includes a memory (not shown) for storing data for a program reproducing an algorithm or an algorithm for controlling the operation of the elements of the inlet apparatus 1. The controller also includes a processor (not shown) for performing the above-operation (not shown). The memory and the processor may be implemented as separate chips. Also, the memory and the processor may be implemented in a single chip.

The inlet apparatus 1 according to the above-described embodiment may further include an outer coil 40. The outer coil 40 is provided so as to surround the outside of the holder 20 and can detect a magnetic flux change due to the upward and downward movement of the locking pin 10. The controller 30 can measure the voltage based on the change of the magnetic flux generated by the locking pin 10 and the outer coil 40 to determine the position of the locking pin 10. The voltage based on the change of the magnetic flux can be obtained by Faraday's law.

Therefore, the controller 30 can control the locking pin 10 to be fixed to a normal position or to return to the normal position as a result of checking the position of the locking pin 10.

Figure 4:
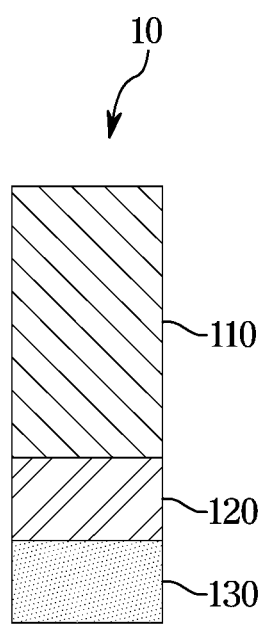
FIG. 4 is a view illustrating a structure of a locking pin according to an embodiment of the disclosure.

FIG. 4 is a view illustrating a structure of the locking pin 10 according to an embodiment of the disclosure.

As shown in FIG. 4, the locking pin 10 may include a metal member 110, an insulating member 120, and a first magnetic substance or body 130. The metal member 110 is a material having no magnetic properties and is exposed to the outside of the inlet apparatus 1. For example, the metal member 110 may be made of an iron ore. The insulating member 120 is an insulator and blocks the metal member 110 from being magnetized by the first magnetic body 130 having magnetism or magnetic properties. For example, the insulating member 120 may be selected from various insulators such as rubber, silicone, and the like. The first magnetic body 130 is a permanent magnet having magnetism.

The first magnetic body 130 can receive a repulsive force or an attractive force to move the locking pin 10 up and down when a magnetic force is generated by applying a current to the first electromagnet 210.

In the above description, the element, structure, and functions of the inlet apparatus 1 according to one embodiment of the disclosure have been described. Hereinafter, the operation of the above-described inlet apparatus 1 is described in detail.

FIGS. 5-8 are views for explaining the structure and operation of an inlet apparatus according to an embodiment of the disclosure. Note that the controller 30 is not shown, for convenience of explanation, but it is noted that the inlet apparatus 1 according to FIGS. 5-8 is controlled by the controller 30.

Figure 5:
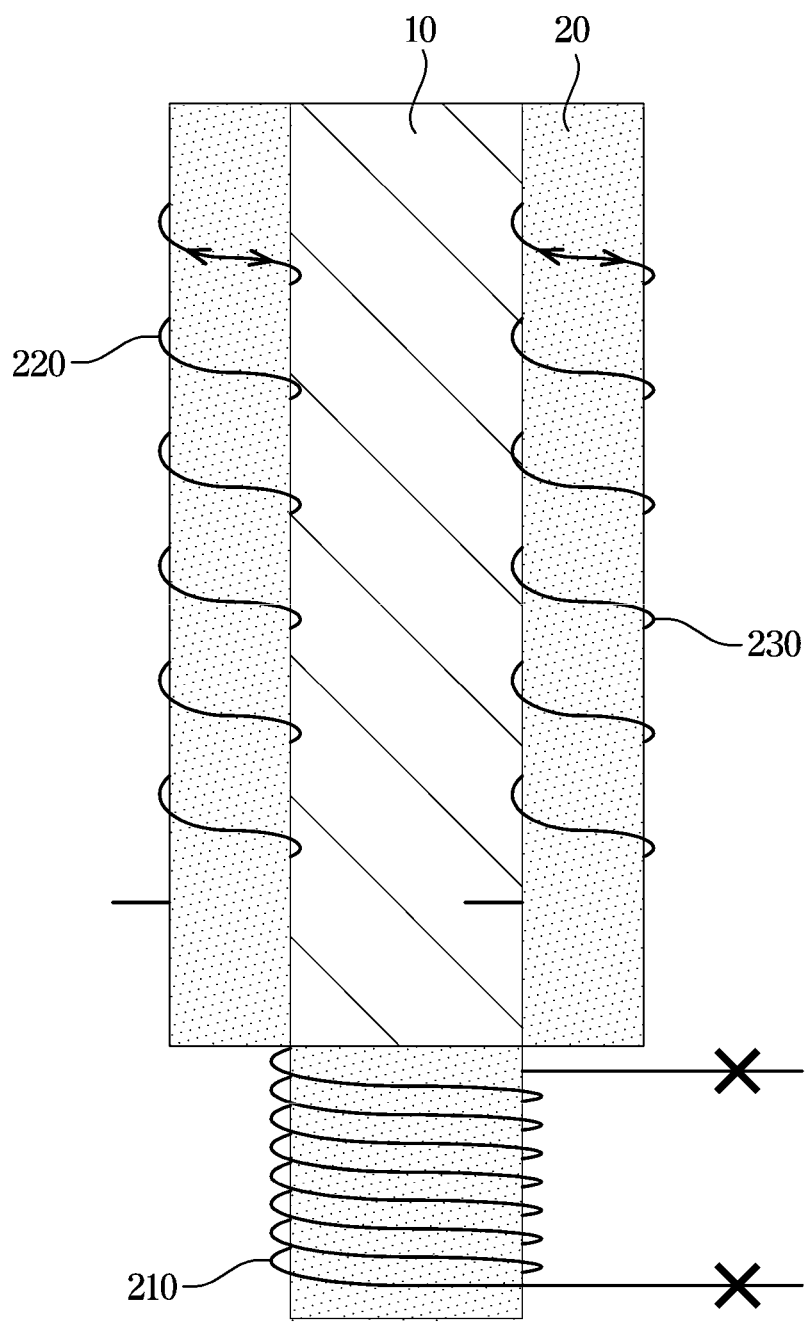
FIGS. 5-8 are views for explaining the structure and operation of an inlet apparatus according to an embodiment of the disclosure.

FIG. 5 shows a case where the inlet apparatus 1 is in the unlocked state. When the inlet apparatus 1 is in the unlocked state as described above, the locking pin 10 should be kept completely received in the holder 20. Accordingly, the second electromagnets 220, 230 can keep the locking pin 10 in a fixed state as a current is applied to the side coil. At this time, the current is not applied to the lower coil of the first electromagnet 210.

Figure 6:
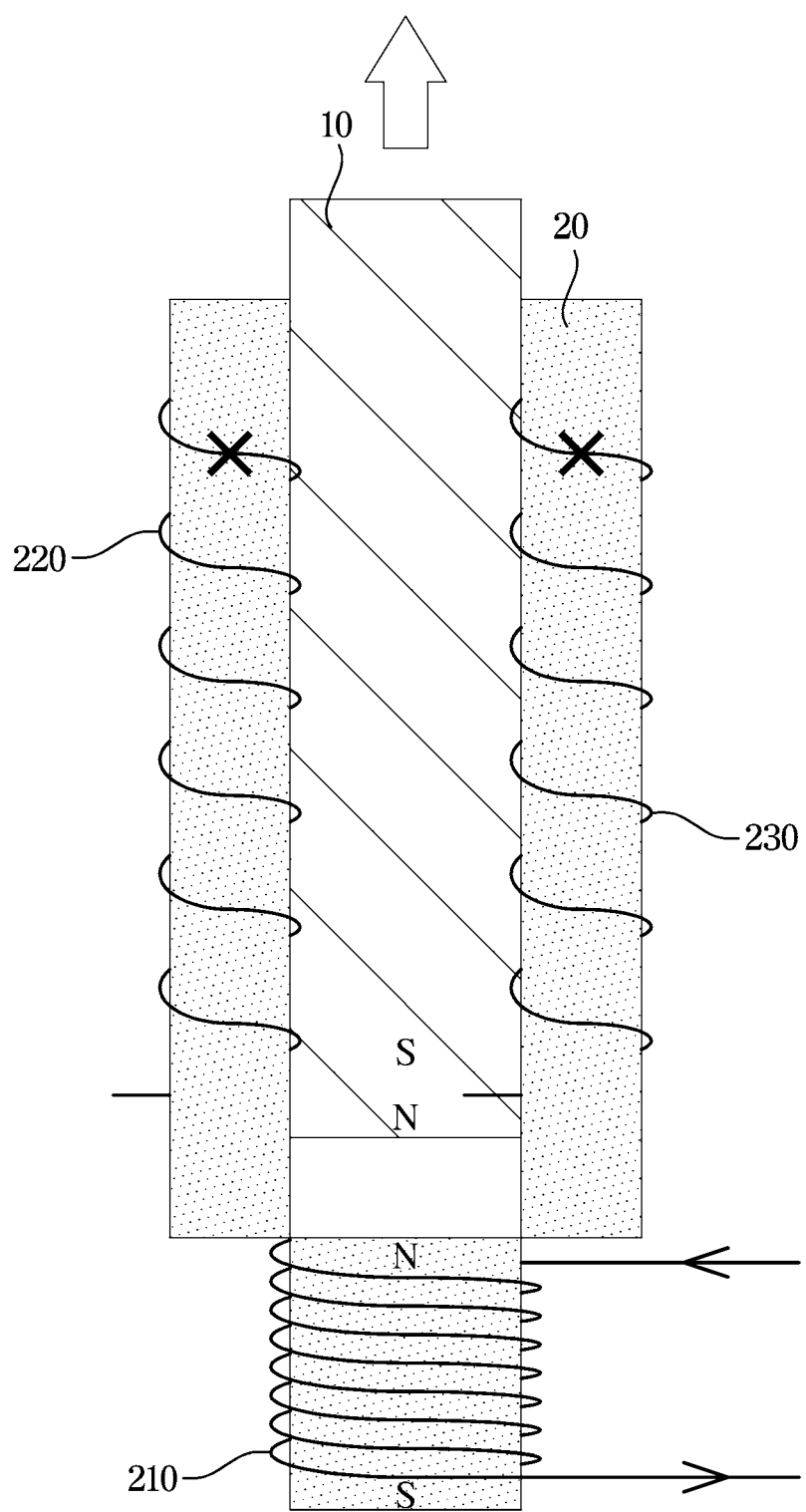

FIG. 6 shows a case where the inlet apparatus 1 is switched from the unlocked state to the locked state. In order for the inlet apparatus 1 to be in the locked state, the locking pin 10 should protrude outward from the holder 20. The locking pin 10 receives a repulsive force as a current in the first direction is applied to the lower coil of the first electromagnet 210 and protrudes to the outside of the holder 20. At this time, the controller 30 controls the current to be applied to the side coil of the second electromagnets 220, 230 so as not to interfere with the movement of the locking pin 10.

Figure 7:
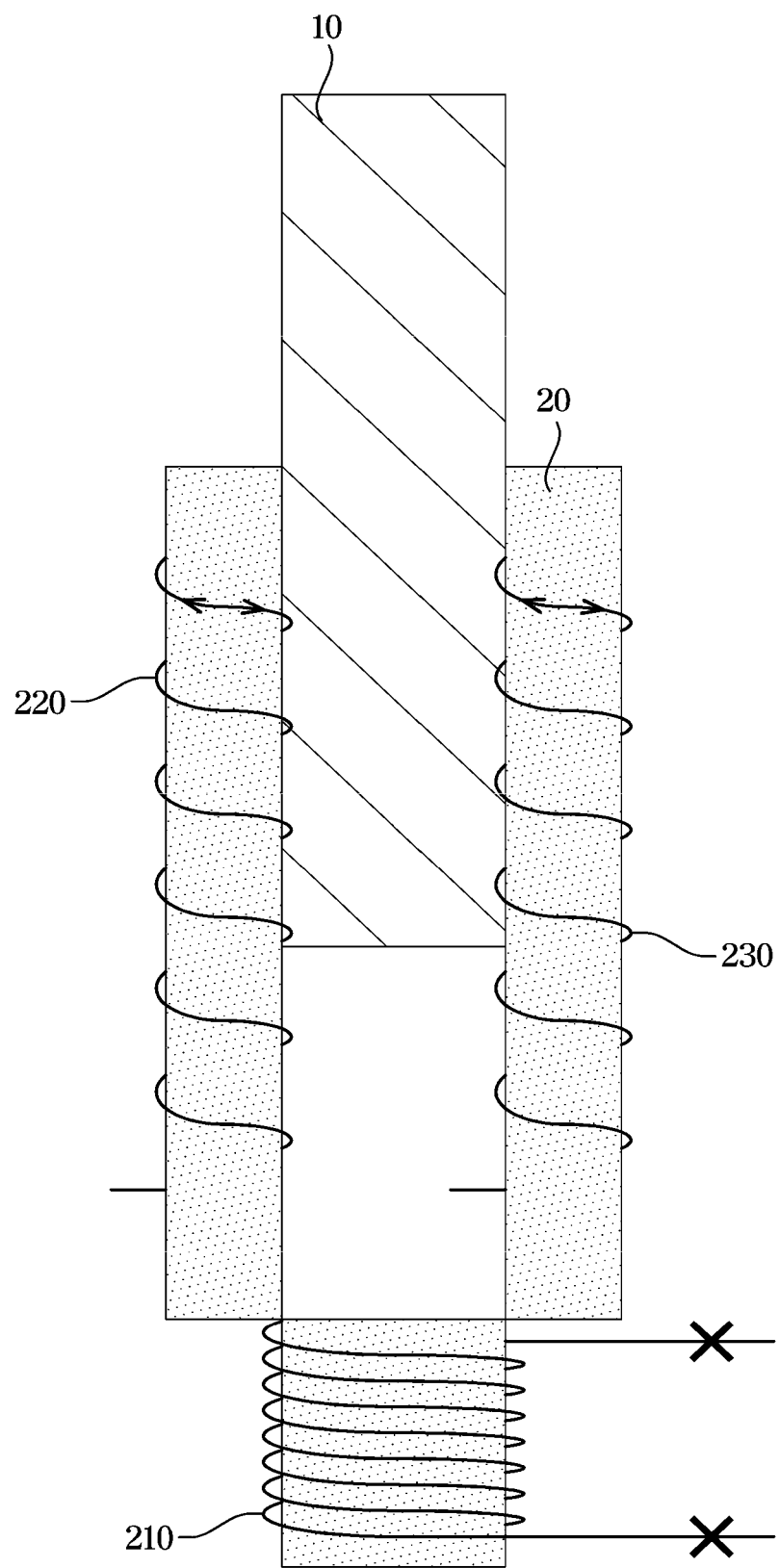

FIG. 7 shows a case where the inlet apparatus 1 is kept in the locked state. The maximum position degree of protrusion can be determined by the setting of the locking pin 10. As described with reference to FIGS. 2 and 3, the controller 30 can determine the position of the locking pin 10 based on the change of the magnetic flux caused by the movement between the locking pin 10 and the outer coil 40. The controller 30 controls the second electromagnets 220, 230 so that a current is not applied to the lower coil of the first electromagnet 210 when it is determined that the position of the locking pin 10 is maximally protruded, so that right and left attractive forces are transmitted to the locking pin 10. Therefore, the locking pin 10 can be held in a protruded state.

Figure 8:
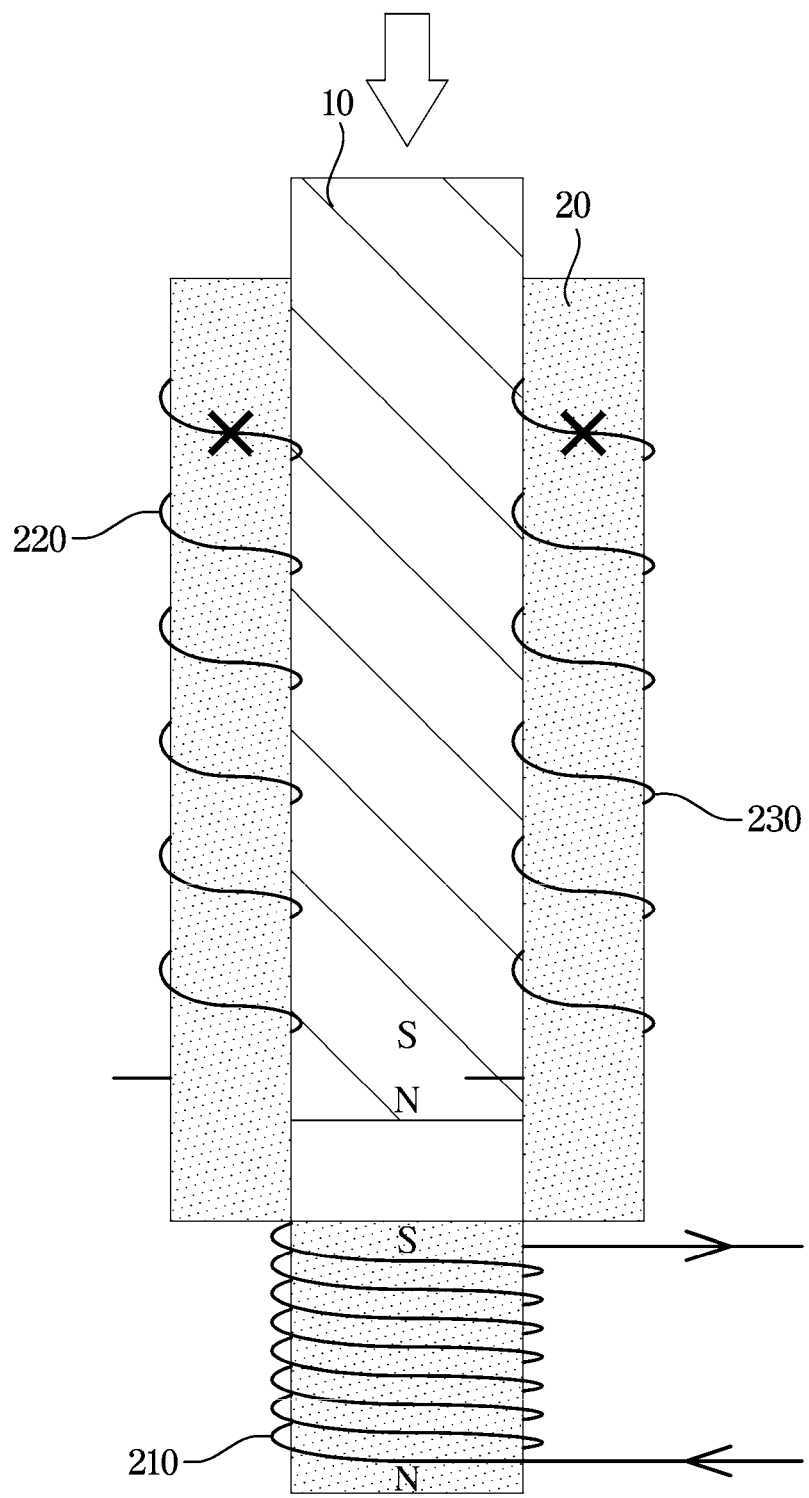

FIG. 8 shows a case where the inlet apparatus 1 is changed from the locked state to the unlocked state. In order for the inlet apparatus 1 to be in the unlocked state, the locking pin 10 must be accommodated in the holder 20. When a current in the second direction is applied to the lower coil of the first electromagnet 210, the locking pin 10 receives an attractive force and is accommodated or withdrawn in the holder 20. At this time, the controller 30 controls the current to be applied to the side coils of the second electromagnets 220, 230 so as not to interfere with the movement of the locking pin 10. When the locking pin 10 is completely accommodated in the holder 20, the inlet apparatus 1 is again in the unlocked state.

FIGS. 9-12 are views for explaining the structure and operation of an inlet apparatus according to another embodiment of the disclosure. Note that the controller 30 is not shown, for convenience of explanation, but it is noted that the inlet apparatus 1 according to FIGS. 5-8 is controlled by the controller 30.

Figure 9:
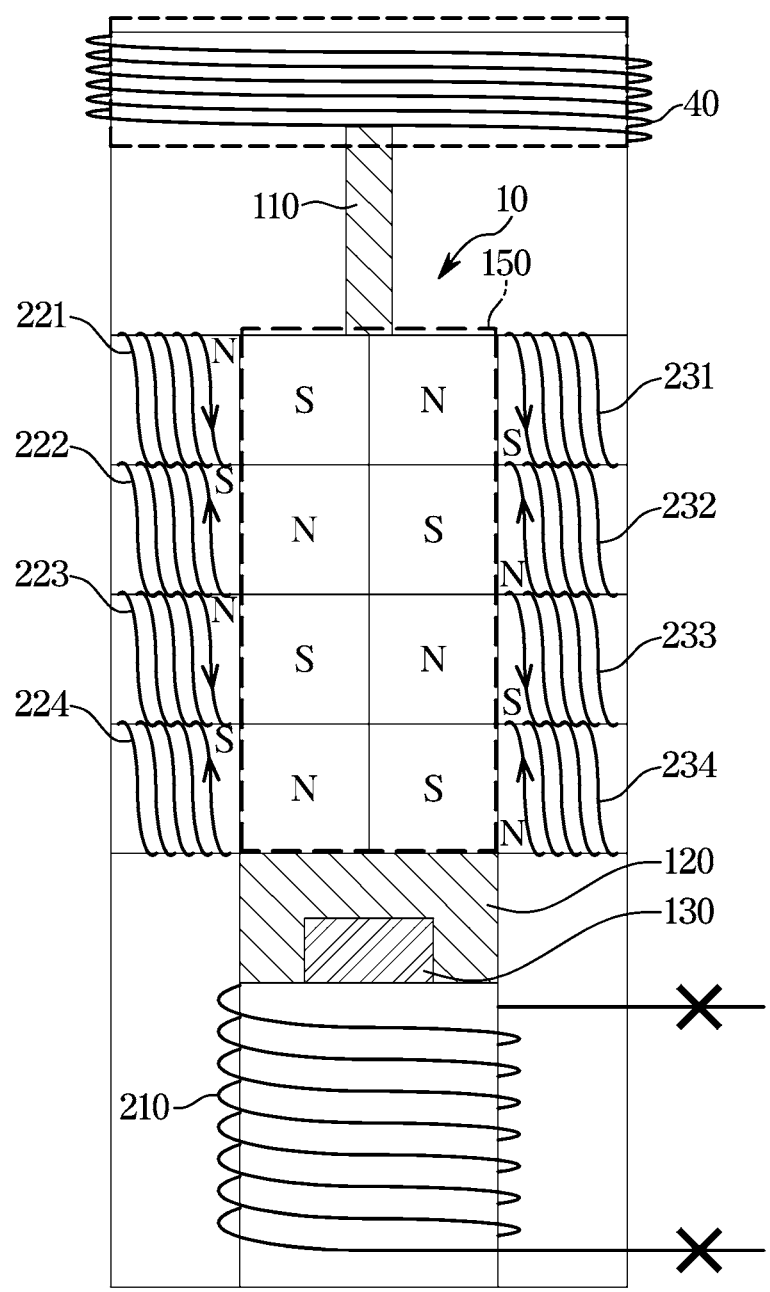
FIGS. 9-12 are views for explaining the structure and operation of an inlet apparatus according to another embodiment of the disclosure.

The locking pin 10 may further include a permanent magnet having a specific pattern to be controlled more precisely. Referring to FIG. 9, the locking pin 10 may include a second magnetic substance or body 150, which is a permanent magnet having a specific pattern.

As shown in FIG. 9, the second magnetic body 150 is a permanent magnet having a specific pattern of layers. The specific pattern of layers viewed from the longitudinal plane is a 4×2 array with different polarities adjacent one another. It is needless to say that the second magnetic body 150 according to FIG. 9 is only one example and may have a specific pattern having an arrangement of 2×2, an arrangement of 3×2, or the like.

The locking pin 10 of the inlet apparatus 1 according to an embodiment includes the insulating member 120, the first magnetic body 130 provided below the insulating member 120, the second magnetic body 150 provided above the insulating member 120, and the metal member 110 provided above the second magnetic body 150.

The second magnetic body 150 may have an arrangement of permanent magnets having a specific pattern. The second magnetic body 150 has a specific pattern of a 4×2 array of layers, and the second electromagnet has first vertical coils 221, 231, second vertical coils 222, 232, third vertical coils 223, 233 and fourth vertical coils 224, 234 that correspond to the layers. Therefore, the permanent magnet in one row, Including the second magnetic body 150, and the electromagnet in one row, including the second electromagnets 220, 230, can perform an electromagnetic interaction. For example, as shown in FIG. 9, the first vertical coil 221 forms a magnetic force of the N pole to the right as the electric current is applied, and an attractive force is applied to the S pole at the top of the second magnetic body 150.

The inlet apparatus 1 according to one embodiment may further include the outer coil 40. As described above, the outer coil 40 grasps the position of the locking pin 10 based on the change of a magnetic flux caused by the movement of the metal member 110. The outer coil 40 may surround the outside of the holder 20 and be provided on the upper portion of the inlet apparatus 1 through which the metal member 110 passes.

Figure 10:
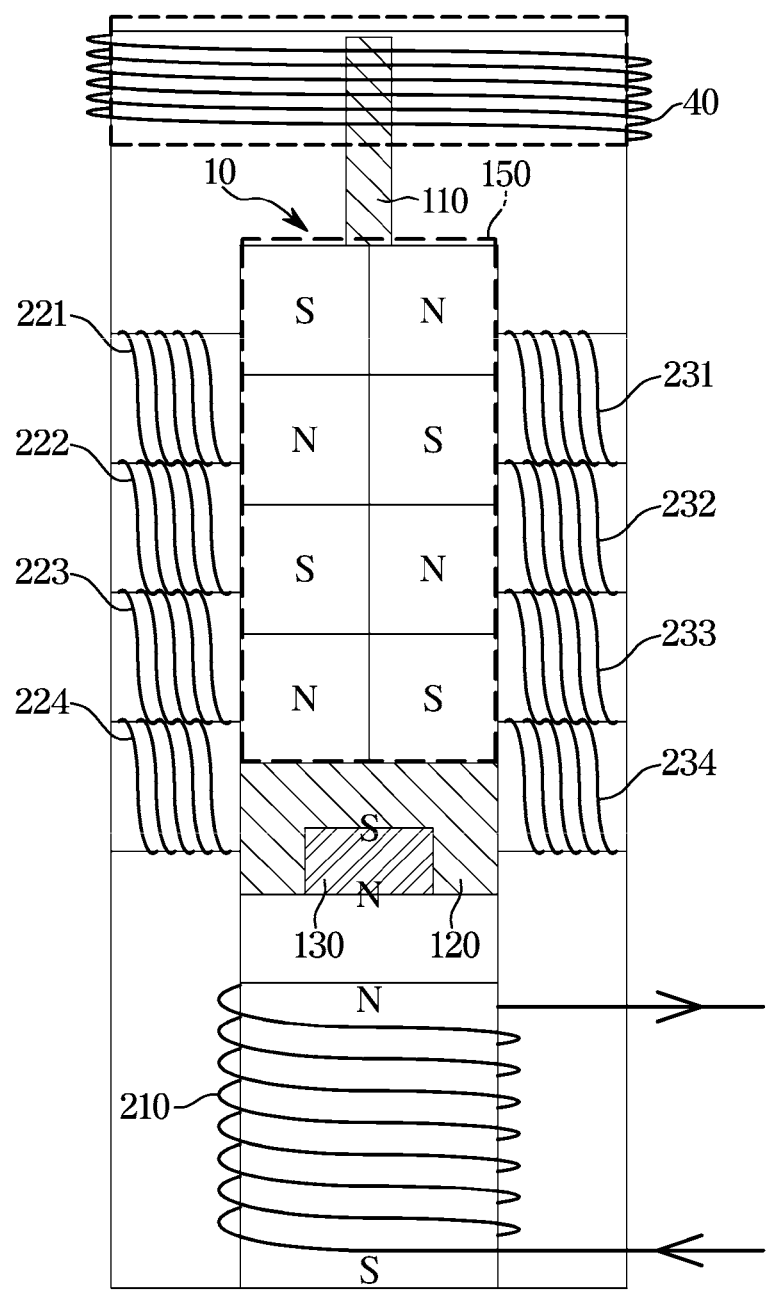

FIG. 10 shows a case where the inlet apparatus 1 is changed from an unlocked state to a locked state. In order for the inlet apparatus 1 to be locked, a portion of the locking pin 10 must protrude outward. The locking pin 10 is transmitted to the lower coil of the first electromagnet 210 as a current in the first direction is applied thereto and is projected or protruded to the outside. At this time, the controller 30 controls so that current is not applied to the plurality of vertical coils 221-224, 231-234 so as to prevent the movement of the locking pin 10.

Figure 11:
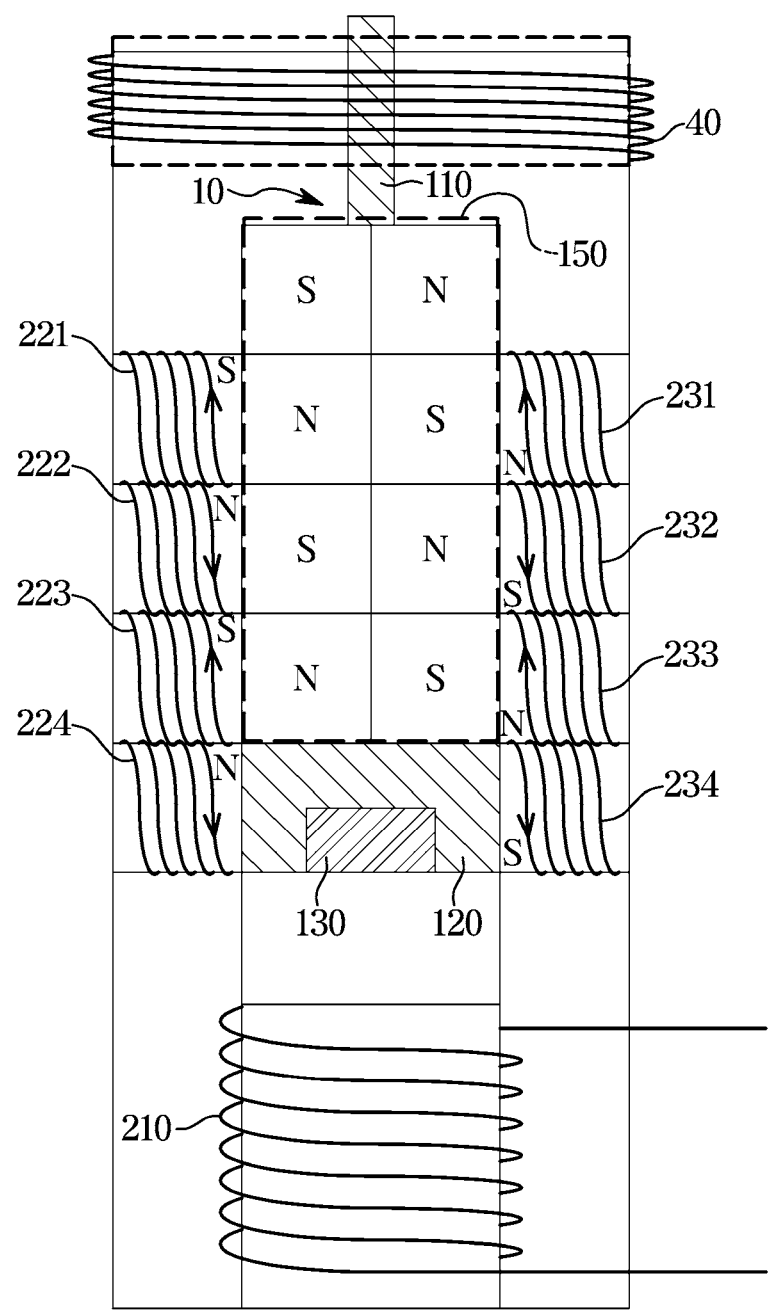

FIG. 11 shows a case in which the inlet apparatus 1 is kept in a locked state. The maximum position or degree of protrusion can be determined by the setting of the locking pin 10. The controller 30 can determine the position of the locking pin 10 based on the change of a magnetic flux due to the movement between the metal member 110 and the outer coil 40. At this time, if it is determined that the position of the locking pin 10 is protruded to the set maximum position, the controller 30 controls the direction of the current flowing in each vertical coil so as to keep the locking pin 10 in a protruding state. Here, the controller 30 controls the current to be applied to the lower coil of the first electromagnet 210 so that the locking pin 10 does not move up and down.

Figure 12:
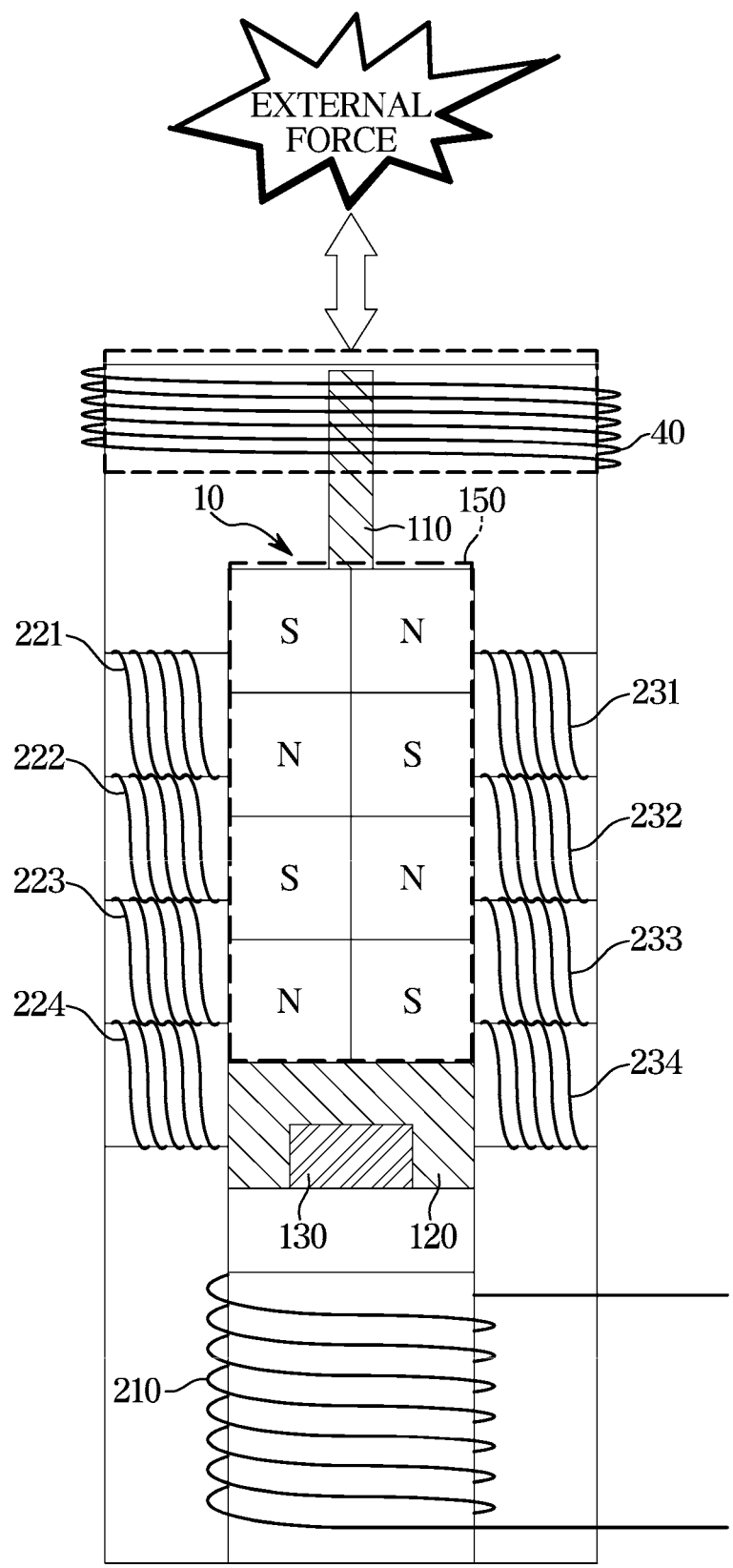

On the other hand, the position of the locking pin 10 of the inlet apparatus may be changed by an external force or other factors (for example, component wear). As shown in FIG. 12, it is difficult to determine the state of the inlet apparatus 1 when an external force is transmitted to the locking pin 10 and the locking pin 10 deviates from the normal position. At this time, if the locking pin 10 deviates from the normal position, the pattern of the second magnetic body 150 and the pattern of the second electromagnet 220 are shifted. In this embodiment, when an external force is generated as in the case described above, the locking pin 10 can be recovered to the normal position by using the pattern of the magnetic body and the electromagnet. Specifically, when a current is applied to the plurality of vertical coils 221-224, 231-234 and magnetic forces in different directions are generated for adjacent vertical coils, the second magnetic body 150 is fixed so as to have a corresponding attractive force.

The controller 30 can perform control for correcting the locking pin 10 from an incorrect position to the normal position in addition to fixing the locking pin 10 according to the pattern of the magnetic body and the electromagnet. The control in this case is performed based on the value of the voltage measured by an induction current of the outer coil 40.

Meanwhile, the disclosed embodiments may be embodied in the form of a recording medium storing instructions executable by a computer. The instructions may be stored in the form of a program code and, when executed by a processor, may generate a program module to perform the operations of the disclosed embodiments. The recording medium may be embodied as a computer-readable recording medium.

The particular computer-readable recording medium may vary and may include all kinds of recording media in which instructions, which may be decoded by a computer, are stored. For example, the recording medium may include a Read Only Memory (ROM), a Random Access Memory (RAM), a magnetic tape, a magnetic disk, a flash memory, an optical data storage device, and the like.

As should be apparent from the above disclosure, the durability of the inlet apparatus, which includes the locking pin, is increased by using the magnetic substance and the electromagnet in place of a tooth wheel. Further, since the movement of the locking pin is detected through the change of the magnetic flux, the accommodated position of the locking pin can be accurately detected.

Although embodiments of the present disclosure have been described for illustrative purposes, those having ordinary skill in the art will appreciate that various modifications, additions and substitutions are possible, without departing from the scope and spirit of the disclosure. Therefore, the embodiments of the present disclosure have not been described for limiting purposes.

What is claimed is:

1. An inlet apparatus comprising:
   a locking pin;
   a holder configured to accommodate the locking pin;
   a first electromagnet provided at a lower portion of the holder and including a lower coil for generating a repulsive force or an attractive force in a vertical direction with respect to the locking pin;
   a second electromagnet configured to include a side coil for fixing the locking pin; and
   a controller configured to control a current of the lower coil of the first electromagnet and a current of the side coil of the second electromagnet.

2. The inlet apparatus according to claim 1, wherein the second electromagnet is provided with the side coil inside the holder.

3. The inlet apparatus according to claim 2, wherein the second electromagnet, which is provided with the side coil surrounding an iron core, is provided inside the holder.

4. The inlet apparatus according to claim 1, further comprising,
an outer coil, which is provided to surround the outside of the holder, is configured to detect a change of a magnetic flux due to upward movement or downward movement of the locking pin,
wherein the controller is connected to the outer coil and is configured to determine a degree of in/out of the locking pin based on the change of the magnetic flux.

5. The inlet apparatus according to claim 1, wherein the locking pin comprises an insulating member, a magnetic substance provided on a lower surface of the insulating member, and a metal member provided on an opposite surface to the lower surface.

6. The inlet apparatus according to claim 1, wherein the controller is configured to control the current of the lower coil to be applied to the lower coil and to control the current of the side coil to be applied to the side coil so that the locking pin is held in the holder.

7. The inlet apparatus according to claim 1, wherein the controller is configured to control the current of the lower coil to be applied to the lower coil to a first direction and to control the current of the side coil to not be applied to the side coil, and wherein the first electromagnet transmits a repulsive force to the locking pin so that the locking pin is configured to protrude.

8. The inlet apparatus according to claim 1, wherein the controller is configured to control the current of the lower coil to not be applied to the lower coil and to control the current of the side coil to be applied to the side coil, and wherein the second electromagnet transmits an attractive force to the locking pin to maintain the locking pin in a protruding state.

9. The inlet apparatus according to claim 1, wherein the controller is configured to control the current of the lower coil to be applied to the lower coil to a second direction and to control the current of the side coil to not be applied to the side coil, and wherein the first electromagnet transmits an attractive force to the locking pin so that the locking pin is accommodated in the holder.

10. The inlet apparatus according to claim 1, wherein the locking pin comprises an insulating member, a first magnetic substance provided on a lower surface of the insulating member, a second magnetic substance provided on an upper surface of the insulating member, and a metal member provided on an upper surface of the second magnetic substance, which includes a first layer and a second layer disposed to cross a polarity of the first layer,
wherein the second electromagnet comprises a first vertical coil corresponding to the first layer and configured to generate a repulsive force or an attractive force on the first layer and comprises a second vertical coil corresponding to the second layer and configured to generate a repulsive force or an attractive force on the second layer.

11. The inlet apparatus according to claim 10, further comprising,
an outer coil, which is provided to surround the outside of the holder and is provided at a position through which the metal member passes and detects a change of a magnetic flux due to upward movement or downward movement of the metal member,
wherein the controller is connected to the outer coil and configured to determine a degree of in/out of the locking pin based on the change of the magnetic flux.

12. The inlet apparatus according to claim 10, wherein the second electromagnet is provided such that the first vertical coil of the first layer and the second vertical coil of the second layer generate magnetic forces of different polarities.

13. The inlet apparatus according to claim 10, wherein the second electromagnet comprises two electromagnets to generate magnetic forces of different polarities with respect to the longitudinal plane of the holder.

* * * * *